Inventors
Wilfried Niederstrasser
Emil Greiner
Albert Krafft
Felix Kusenberg
by Michael S. Striker
Atty United States Patent Office 3,497,943
Patented Mar. 3, 1970

3,497,943
METHOD OF PRODUCING TUBES
Wilfried Niederstrasser, Emil Greiner, Albert Krafft, and Felix Kusenberg, Mulheim an der Ruhr, Germany, assignors to Thyssen Roehrenwerke Aktiengesellschaft, Duesseldorf, Germany
Filed Feb. 1, 1966, Ser. No. 524,279
Int. Cl. B23k 31/02
U.S. Cl. 29—477                                10 Claims

ABSTRACT OF THE DISCLOSURE

In producing a tube from a strip of weldable material having two longitudinally extending parallel edge faces, at least one edge face is provided with a longitudinally extending facet inclined to the remainder of the edge face. The strip is arcuately transversely deformed until the edge faces are juxtaposed and define a longitudinally extending groove. The non-faceted portions of the edge faces are pressure-welded together. A filler material is introduced into the groove and fusion-welded to the surrounding material of the strip. Finally, the pressure-welded edge faces are also fusion-welded to merge with the preceding fusion-welded seam.

---

The present invention relates to the production of tubes. More specifically, the invention relates to the production of tubes from elongated strips of material. Still more specifically, the invention relates to a method of producing a tube from an elongated strip of weldable material, and to an apparatus for carrying out this method.

In the production of tubes from elongated strips of weldable material which are arcuately deformed transversely of the elongation, whereupon the thus-formed tube is welded along the abutting edge faces of the strip, it is known to join the abutted edge faces by means of pressure welding, that is by induction-heating the strip with simultaneous application of pressure so as to weld the abutting edge faces together. Although the resulting tube is generally satisfactory, the weld nevertheless is of a rather brittle nature since fusion of the material does not take place through out the entire thickness of the strip. Thus, tubes so produced are not satisfactory for applications where great mechanical strength is demanded of the weld.

It is also known to fusion-weld the edge faces together; however, in the prior-art processes this requires elaborate preparation to assure that the opposed edge faces are exactly parallel with one another so that the automatic welding device used for fusion-welding operations will be properly guided by them. This is time-consuming and the resulting product is rather expensive.

It is therefore a general object of the present invention to overcome the disadvantages of the prior art.

A more specific object of the present invention is to provide a method of producing a tube from a strip of weldable material, wherein the longitudinally extending welded seam will be of very high quality and be able to withstand great mechanical stresses.

Still a more specific object of the invention is to produce a tube of the above-described type in a continuous manner.

Another object of the invention is to provide an apparatus for producing a tube such as outlined above.

In accordance with one feature of the invention we disclose a method of producing a tube from a strip of weldable material having two longitudinally extending parallel edge faces. This method comprises the steps of arcuately deforming the strip transversely of its elongation, providing each of the edge faces of the strip with a facet which is inclined with reference to the remainder of the respective edge face, so that the facets will be mutually inclined when the edge faces are juxtaposed with one another and will thereby define with each other a groove extending in longitudinal direction of the deformed strip. Subsequently, the remainders of the edge faces are bonded together, a filler material is introduced into the groove and fusion-welded to the surrounding material of the now-formed tube, thus producing a first weld seam coincident with the groove. Finally, the remainder of the edge faces is fusion-welded so that the resulting second weld seam extends through the material of the tube and becomes integral with the first weld seam.

Of course, it is well known to continuously arcuately deform a strip of material transversely of its elongation so as to form a tube which has an open elongated slot. The devices for so deforming a strip form no part of the present invention, and it is not believed that it will be necessary to describe them.

Immediately following the point at which the strip has been formed into the slotted tube the edge faces of the strip, which are not juxtaposed but spaced from each other, are in accordance with the invention each provided with a facet which is inclined with reference to the remainder of the respective edge face. In other words, on one or on both sides of the strip there will be provided a facet or surface which is inclined with respect to the remains of the edge face and which will hereafter be referred to as the "reduced edge face." When, now, the respective reduced edge faces are placed into abutment with one another, the facets on the respective reduced edge faces will be mutually inclined with respect to each other and will form a groove in longitudinal direction of the now-formed tube. This groove is adapted to. Of course, if each edge face is provided with two facets, that is with a facet on each side of the strip, then there will be two grooves, one located within the tube and one without.

To assure that the reduced edge faces are properly aligned and remain properly aligned, the reduced edge faces are now bonded together by pressure-welding which is well known per se. Up to this point the thus produced tube is possessed of the disadvantages of the prior art in that the weld is incapable of resisting substantial mechanical stress.

Immediately following the pressure-welding of the respective reduced edge faces, filler material will now be introduced into the groove defined between the mutually inclined facets, and such filler material will be electrically fusion-welded to the surrounding parent material of the tube.

However, this fusion-welded seam does not extend through the thickness of the material. In other words, the zone in which the material is properly joined by this fusion-welding not equal to the thickness of the material.

The reduced edge faces are now welded a second time, namely by electrical fusion-welding. During this second welding the bead disappears. The weld zone from this second fusion-welded seam extends into the material to a depth which is sufficient to penetrate to the weld-zone of the first fusion-welded seam on the other side, so that the material is now joined throughout its entire thickness. The resulting unitary weld is of great strength and able to withstand mechanical stresses much better than welds produced with the processes krown herebefore.

Of course, it is also possible to provide facets along the respective edge faces on both sides of the strip so that, when the remainders of the edge faces are abutted and temporarily secured together, there will be two grooves, which may advantageously be of V-shaped cross section and which will extend within and without the tube coextensive with one another. The weld bead formed by the pressure-welding process will then be located in one of these grooves. The bead will again flow as before, when the edge faces are subsequently fusion-welded to one another; however, since the material of the weld bead will not be adequate to fully fill the groove in question, it will be necessary to apply in this groove, as also in the other one, an additional amount of filler material.

In accordance with a further feature of our invention we provide an apparatus for carrying out the above-mentioned method. Such apparatus, which serves for producing a tube from an advancing strip of weldable material which is arcuately deformed transversely of its elongation and provided with two longitudinally extending parallel edge faces, may comprise means for providing each of the edge faces with a facet which is inclined with reference to the remainder of the respective edge face, so that the facets will be mutually inclined in juxtaposed position of said remainders and will together define a groove extending lengthwise of the strip. We will further provide means for temporarily bonding the above-mentioned remainders together so as to produce a closed tube, means for producing a fusion-welded seam along said groove, and means for producing a fusion-welded seam along said remainders so that both of said seams meet and form into a single seam extending through the thickness of the material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
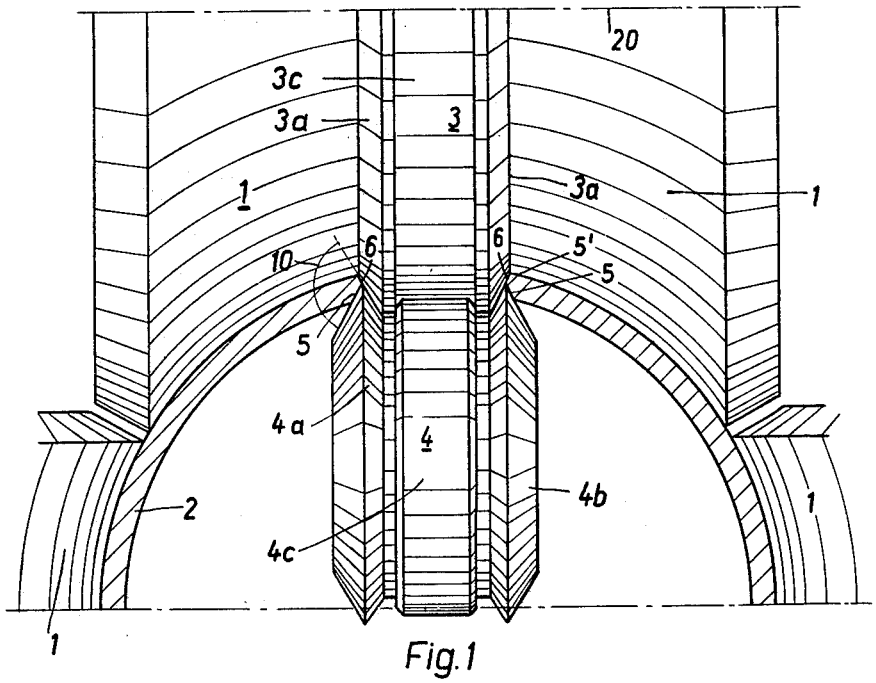
FIG. 1 is a sectional elevational view of an apparatus in accordance with the present invention, including a partially formed tube.

Discussing now the drawing in detail, and firstly FIG. 1 thereof, it will be seen that the strip of material has already been arcuately deformed to a slotted tube 2. The slotted tube will be peripherally supported by support means 2 which may be of any known construction. A forming roller 3, which advantageously is fixedly connected to the support means 1 for rotation relative thereto, is profiled so as to be provided with a central circumferential recess 3c and on opposite sides thereof with respective angular surface portions 3a which are inclined relative to the axis of roller 3 and which, in the embodiment of FIG. 1, may define frusto-conical surface portions.

On the other side of the strip, that is in the interior of the almost-closed tube 2, there is located a back-up roller 4 which is provided with a circumferentially projecting portion or shoulder 4c which is complementary to and engages in the recess 3c of roller 3, and which is provided on opposite sides of the shoulder 4c with respective outwardly diverging surface portions 4a located on opposite sides of the shoulder 4c, to which there are adjoined outwardly frustoconical portions 4b. The width of the portions 4a of roller 4 is somewhat less than the width of the portions 3a of roller 3, so that the edge faces of the slotted tube 2 are provided by the surfaces 3a of the roller 3 with a surface portion 6. Upon abutting of the surface portions 6 these will extend substantially radially of the tube 2. On the interior of the tube the edge faces are each provided with a facet 5 by the portion 4b of the roller 4. These facets 5 are inclined to the surface portions 6 and, upon abutting of these portions 6, the facets 5 will be mutually inclined and will define a groove 7, which in the embodiment of FIG. 1 is a V-shaped groove, in the interior of the tube (see FIG. 2). The respective surface portions 6 and facets 5 enclose an obtuse angle 10.

Of course, it should be understood that a groove similar to the groove 7 can also be provided on the exterior of the tube 2. It is simply necessary in this case to so profile the surface portion 3a of roller 3 that it is in effect stepped, that is that the axially outermost part of each of the surface portions 3a defines a smaller angle with the axis of the roller 3 than the adjacent axially innermost part of the respective surface portion 3a. Such a construction will result in the provision of two coextensive grooves located respectively within and without the tube, while intermediate these grooves there will remain a surface 6 which will naturally be reduced in its width as compared to that shown in FIG. 1.

Upon the profiling of the edge faces as described herebefore, the open tube 2 will then be further closed in a known manner by additional engaging means until the surfaces 6 abut one another. Simultaneous heating and the abutting pressure will cause pressure-welding along the surfaces 6. There will thus be provided a welded seam 8 with a weld bead 8' which extends outwardly from the surface of the tube 2.

It will be understood that the slotted tube 2 will be precisely guided and firmly held by the various forming and dividing means 1, 3 and 4 so that the faces 6 will always be in exact alignment and the deformation of the edge faces can be accomplished within very narrow tolerances.

Figure 2:
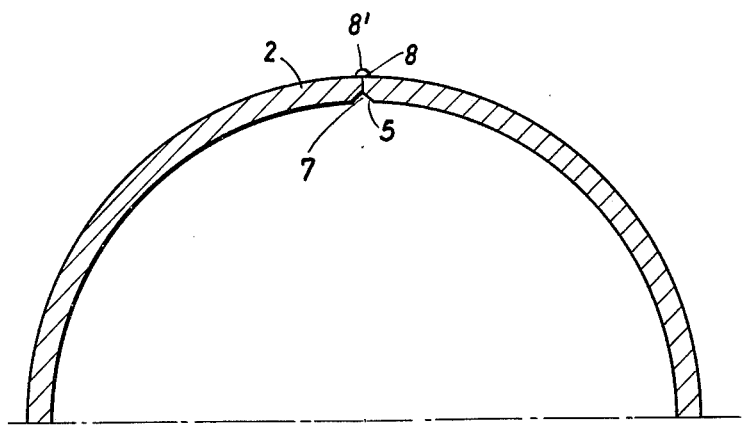
FIG. 2 shows the tube of FIG. 1 completely formed, but not yet welded, in view similar to that of FIG. 1.

Since it has been found advantageous to utilize the novel methods in a continuous production line, the now-formed tube will be rotated about its axis through 180°, assuming that the V-shaped groove 7 is outwardly open as shown in FIG. 2 of the drawing. This turning movement is preparatory to fusion welding of the tube along the groove 7 and is necessary since filler material is introduced into the tube and into the groove for the purpose of the fusion-welding operation. Obviously, to prevent escape of this material from the groove it is necessary that the latter should face upwardly. Subsequent thereto the tube is again rotated about its longitudinal axis through 180°, so that the welded seam 8 is again facing in upward direction. Then the faces 6 are joined together by a second fusion-welding operation during which the weld bead 8 will flow and thereby disappear, thus providing a smooth transition between the edge portions which border the respective surfaces 6. The resulting weld, that is the fusion weld produced on the inside and on the outside of the tube 2, will extend through the entire thickness of the material thereof and will thus in effect be a unitary weld of much greater strength than has been possible heretofore.

Figure 3:
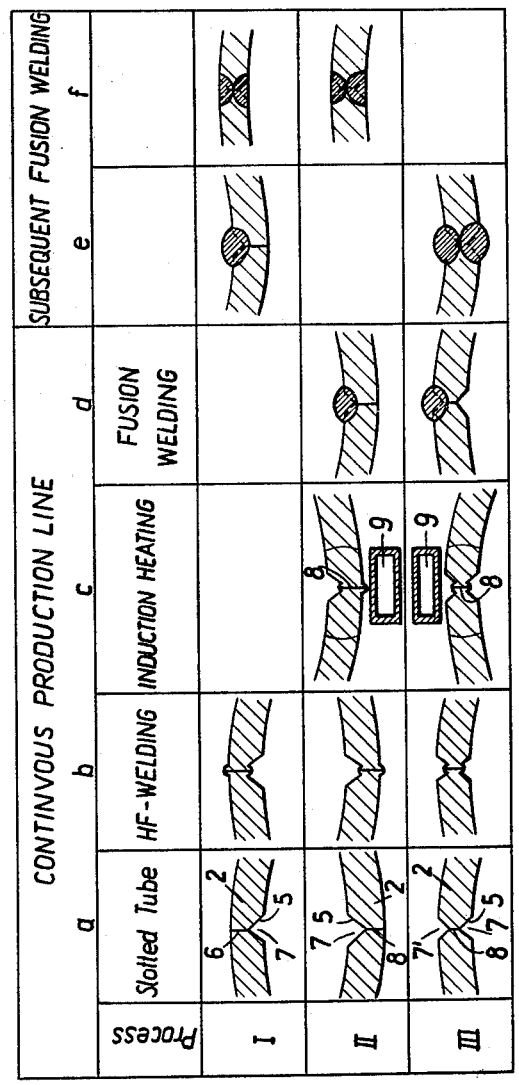
FIG. 3 is a flow chart showing the major steps of the inventive method in three different embodiments and as applied in a continuous production line.

FIG. 3 shows three different possible applications of the inventive method in a continuous production line for the manufacture of welded tubes. In each of these three different applications I, II and III it is assumed that the tube has already been preformed to the stage shown in FIG. 1. In other words, it is assumed that it has left the profiling rollers 3 and 4. Discussing then firstly the stage shown in FIG. 3(I), it will be seen that in column a the tube is completely closed by abutting of the surfaces 6. Column c shows how the surfaces 6 are welded together by means of pressure-welding, preferably high frequency welding. Column e shows how, after the tube has been rotated about its longitudinal axis through 180°, the V-shaped groove 7 is filled and welded by means of a fusion-welding process and column f shows how, after the tube has again been rotated about its longitudinal axis through 180°, the fusion-welding process is repeated along the original high frequency weld seam 8, whereby the weld bead 8' disappears and the fusion-welding zone adjoins with that produced during welding of the V-shaped groove 7, so that the material is welded throughout its entire thickness.

Process II in FIG. 3 deviates in columns a and b from process I in that the slot of the slotted tube is initially positioned in downward direction. Column c indicates that subsequent to the high frequency pressure-welding operation the entire welding seam is heated, for instance by means of an induction coil 9. Immediately subsequent thereto, as indicated in column d, a fusion-welding process welds the tube along the groove 7. Subsequently the tube is rotated about its longitudinal axis through 180° and, as is evident from column f, the high frequency weld seam 8 and the weld head 8' are again produced in the manner shown in process I, column f.

Process III, finally, indicates treatment of the tube if the latter is formed with two coextensive grooves respectively located within and without the tube. The interior groove is indicated with reference numeral 7 whereas the exterior groove is indicated with reference numeral 7', and it will be seen in columns b and c that the treatment of the tube is identical with that of process II. In column d fusion-welding takes place first along the exterior groove 7' with addition of a filler material, whereas column e indicates that the tube is subsequently rotated about its longitudinal axis through 180° whereupon fusion-welding is repeated along the interior groove 7, also with the addition of filler material.

It will be understood, of course, that inductive heating of the weld zone prior to the fusion-welding process or processes increases the speed of fusion-welding so that the entire continuous production line can operate at a higher speed than would be possible without this additional measure. Also, and in view of the fact that the process should be as continuous as possible, forming of the strip to the slotted tube, profiling of the edge faces, and the high frequency welding for the temporary joining of the faces 6 will preferably be continuous and will take place simultaneously on longitudinally spaced portions of the strip or the tube formed from the strip. It is preferred, also, to perform one of the fusion-welding operations as part of the continuous production and simultaneously with the various forming steps. However, this is possible only if the groove, along which such fusion-welding is to take place, faces in upward direction. In other words, it is possible in the processes shown in FIG. 3 under II and III in column d. The subsequent second fusion-welding operation cannot be continuous with the first such operation since it is necessary that the tube be rotated about its longitudinal axis through 180° Therefore, the welding-operations in columns e and f under II and III must be carried out separately.

It will be understood that each of the elements described above, or two or more together, may also find a useful application in other types of tube production differing from the types described above.

While the invention has been illustrated and described as embodied in a method of, and apparatus for, tube production, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a tube from a strip of weldable material having two longitudinally extending parallel edge faces, said method comprising providing each of said edge faces with a longitudinally extending facet which is inclined with reference to the remainder of the respective edge face; arcuately deforming said strip transversely of its elongation so as to juxtapose said edge faces, whereby said facets together define a V-groove extending in longitudinal direction of the deformed strip; pressure welding the non-faceted remainder of the edge faces together; introducing into said V-groove a filler material and fusion-welding the same to the surrounding material of the thus formed tube to form a first fusion weld seam; and fushion-welding said pressure welded edge faces so that the seam of this weld merges into said first fusion-weld seam.

2. A method as defined in claim 1, wherein said facet is provided after said strip has been arcuately deformed to such an extent that the distance of said edges of said strip is small in relation to the diameter of the tube to be produced.

3. A method as defined in claim 1, wherein said remainder of the edge faces is located adjacent the exterior surface of said tube and wherein said groove faces the interior of the tube.

4. A method as defined in claim 3; and further comprising positioning said tube, prior to introduction of said filler material thereinto, with the open V-shaped groove facing upwardly so as to prevent escape of said filler material therefrom during fusion-welding of the latter to the surrounding material.

5. A method as defined in claim 2, wherein said strip is arcuately deformed transversely of its elongation until it assumes the shape of a tube having a longitudinal slot therein whose transverse cross-section is small with respect to the cross-section of said tube.

6. A method as defined in claim 5; and further comprising positioning said tube, prior to introduction of said filler material thereinto, with the open V-shaped groove facing upwardly so as to prevent escape of said filler material therefrom during fusion-welding of the latter to the surrounding material.

7. A method as defined in claim 6; and comprising the additional step of positioning said tube, after fusion-welding of said filler material in said groove, with said weld bead facing upwardly so that, upon fusion-welding of said remainder, the material of said weld bead will flow apart and form a smooth transition between the edge portions bordering the respective remainder of said edge faces.

8. A method as defined in claim 7; and further comprising the step of providing prior to pressure-welding of said remainder, each of said edge faces with a second facet located on the other side of said strip from said first facet so that said second facets together will define, in abutted condition of said remainder, a second groove extending lengthwise of said tube, and so that said weld bead which is formed during said pressure welding will be located within said second groove.

9. A method as defined in claim 6, and further comprising the step of heating the material of said tube adjacent to the respective edge faces prior to fusion-welding.

10. A method as defined in claim 1, wherein the steps recited take place continuously and substantially simultaneously at portions of the tube which are longitudinally spaced apart.

References Cited

UNITED STATES PATENTS

| | | | |
|---|---|---|---|
| 2,160,586 | 5/1939 | Gettig | 29—486 |
| 2,300,850 | 11/1942 | Wolcott | 29—477 |
| 2,567,012 | 9/1951 | Donelan | 29—477 |
| 3,288,981 | 11/1966 | Marby | 29—482 |

OTHER REFERENCES

Rossi, B. E., Welding Engineering, 1954, McGraw-Hill Book Co., pp. 554–561 relied upon.

JOHN F. CAMPBELL, Primary Examiner

U.S. Cl. X.R.

29—483, 497